United States Patent
Serkowski et al.

(10) Patent No.: US 7,228,567 B2
(45) Date of Patent: Jun. 5, 2007

(54) LICENSE FILE SERIAL NUMBER TRACKING

(75) Inventors: Robert J. Serkowski, Broomfield, CO (US); William T. Walker, Evergreen, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 961 days.

(21) Appl. No.: 10/232,507

(22) Filed: Aug. 30, 2002

(65) Prior Publication Data

US 2004/0044901 A1    Mar. 4, 2004

(51) Int. Cl.
G06F 11/30 (2006.01)
H04L 9/32 (2006.01)

(52) U.S. Cl. ............ 726/30; 713/156; 713/172; 713/176; 726/2; 726/26; 726/27; 726/29; 705/59; 705/400; 380/231; 707/100

(58) Field of Classification Search ............ 713/156, 713/172, 176; 726/2, 27, 29, 30; 705/59, 705/400; 380/231; 707/100
See application file for complete search history.

(56) References Cited

U.S. PATENT DOCUMENTS

| | | | |
|---|---|---|---|
| 4,288,659 A | 9/1981 | Atalla | 178/22.08 |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A | 6/1990 | Robert et al. | |
| 5,157,663 A | 10/1992 | Major et al. | |
| 5,179,591 A | 1/1993 | Hardy et al. | 380/21 |
| 5,204,897 A * | 4/1993 | Wyman | 710/200 |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | |
| 5,329,570 A | 7/1994 | Glassmacher et al. | 379/189 |
| 5,341,427 A | 8/1994 | Hardy et al. | 380/21 |
| 5,386,369 A * | 1/1995 | Christiano | 705/400 |
| 5,390,297 A | 2/1995 | Barber et al. | |

(Continued)

FOREIGN PATENT DOCUMENTS

EP    1 071 253 A1 * 1/2001

OTHER PUBLICATIONS

U.S. Appl. No. 09/357,679, filed Jul. 20, 1999, Serkowski.

(Continued)

*Primary Examiner*—Taghi T. Arani
(74) *Attorney, Agent, or Firm*—Sheridan Ross P.C.

(57) ABSTRACT

A system for monitoring licensing eligibility of a computational component, the computational component being associated with a unique identifier, is provided. The system comprises (i) an input and/or interface 120 operable to receive a request to authorize operation of at least part of the computational component; (ii) a memory, such as licensing database 128, comprising licensing database information associated with the identifier, the information comprising a licensing state indicator; and (iii) an activator, such as remote feature activator 112, operable to (a) authorize operation of the at least part of the computational component when the licensing state indicator has a first state and (b) not authorize operation of the at least part of the computational component when the licensing state indicator has a second state other than the first state.

43 Claims, 4 Drawing Sheets

U.S. PATENT DOCUMENTS

| | | | |
|---|---|---|---|
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |
| 5,671,412 A * | 9/1997 | Christiano | 707/104.1 |
| 5,699,431 A | 12/1997 | Van Oorschot et al. | 380/30 |
| 5,708,709 A | 1/1998 | Rose | 705/59 |
| 5,717,604 A | 2/1998 | Wiggins | 709/229 |
| 5,742,757 A | 4/1998 | Hamadani et al. | |
| 5,745,576 A | 4/1998 | Abraham et al. | 380/25 |
| 5,745,879 A | 4/1998 | Wyman | 705/1 |
| 5,758,068 A | 5/1998 | Brandt et al. | 726/27 |
| 5,758,069 A * | 5/1998 | Olsen | 726/27 |
| 5,790,074 A | 8/1998 | Rangedahl et al. | 342/357.13 |
| 5,790,664 A | 8/1998 | Coley et al. | 380/4 |
| 5,828,747 A | 10/1998 | Fisher et al. | |
| 5,905,793 A | 5/1999 | Flockhart et al. | |
| 5,905,860 A * | 5/1999 | Olsen et al. | 726/27 |
| 5,940,504 A | 8/1999 | Griswold | 705/59 |
| 5,960,085 A | 9/1999 | de la Huerga | |
| 5,978,565 A | 11/1999 | Ohran et al. | |
| 5,982,873 A | 11/1999 | Flockhart et al. | |
| 6,011,973 A | 1/2000 | Valentine et al. | 455/456.6 |
| 6,023,766 A | 2/2000 | Yamamura | |
| 6,067,621 A | 5/2000 | Yu et al. | |
| 6,108,703 A | 8/2000 | Leighton et al. | 709/226 |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,502,079 B1 | 12/2002 | Ball et al. | 705/59 |
| 6,513,121 B1 * | 1/2003 | Serkowski | 726/29 |
| 6,574,612 B1 | 6/2003 | Baratti et al. | |
| 6,584,454 B1 | 6/2003 | Hummel et al. | |
| 6,765,492 B2 | 7/2004 | Harris | 340/686.6 |
| 6,775,782 B1 * | 8/2004 | Buros et al. | 726/2 |
| 6,778,820 B2 | 8/2004 | Tendler | 455/414.2 |
| 6,826,606 B2 | 11/2004 | Freeman et al. | 709/223 |
| 6,850,958 B2 | 2/2005 | Wakabayashi | |
| 6,854,010 B1 | 2/2005 | Christian et al. | |
| 6,883,095 B2 | 4/2005 | Sandu et al. | |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,848 B1 | 8/2005 | King et al. | |
| 6,976,164 B1 | 12/2005 | King et al. | |
| 7,032,113 B2 | 4/2006 | Pendlebury | |
| 7,085,382 B2 | 8/2006 | Terao et al. | |
| 2001/0013024 A1 | 8/2001 | Takahashi | |
| 2002/0001302 A1 | 1/2002 | Pickett | 370/352 |
| 2002/0017977 A1 | 2/2002 | Wall | 340/5.28 |
| 2002/0038422 A1 | 3/2002 | Suwamoto et al. | |
| 2002/0052939 A1 | 5/2002 | Lee | |
| 2002/0083003 A1 | 6/2002 | Halliday | 705/52 |
| 2002/0087892 A1 | 7/2002 | Hideyo | |
| 2002/0107809 A1 | 8/2002 | Biddle et al. | |
| 2002/0112186 A1 | 8/2002 | Ford et al. | |
| 2002/0125886 A1 | 9/2002 | Bates et al. | 324/307 |
| 2002/0154777 A1 | 10/2002 | Candelore | 380/258 |
| 2002/0164025 A1 * | 11/2002 | Raiz et al. | 380/231 |
| 2002/0174356 A1 | 11/2002 | Padole et al. | 713/200 |
| 2002/0176404 A1 | 11/2002 | Girard | 370/352 |
| 2002/0188656 A1 | 12/2002 | Patton et al. | |
| 2002/0194473 A1 | 12/2002 | Pope et al. | |
| 2003/0005427 A1 | 1/2003 | Herrero | 717/178 |
| 2003/0013411 A1 | 1/2003 | Uchiyama | |
| 2003/0055749 A1 | 3/2003 | Carmody et al. | |
| 2003/0144959 A1 | 7/2003 | Makita | |
| 2003/0149874 A1 | 8/2003 | Balfanz et al. | |
| 2003/0208449 A1 | 11/2003 | Diao | |
| 2004/0044629 A1 * | 3/2004 | Rhodes et al. | 705/59 |
| 2004/0054909 A1 * | 3/2004 | Serkowski et al. | 713/176 |
| 2004/0073517 A1 | 4/2004 | Zunke et al. | 705/59 |
| 2004/0078339 A1 | 4/2004 | Goringe et al. | 705/59 |
| 2004/0103324 A1 | 5/2004 | Band | |
| 2004/0128551 A1 | 7/2004 | Walker et al. | 713/201 |
| 2004/0162998 A1 | 8/2004 | Tuomi et al. | |
| 2004/0166878 A1 | 8/2004 | Erskine et al. | 455/456.1 |
| 2004/0172367 A1 | 9/2004 | Chavez | 705/59 |
| 2004/0181695 A1 | 9/2004 | Walker | 713/202 |
| 2004/0181696 A1 | 9/2004 | Walker | 713/202 |
| 2004/0199760 A1 | 10/2004 | Mazza | 713/150 |
| 2004/0260589 A1 | 12/2004 | Varadarajan et al. | |
| 2005/0086174 A1 | 4/2005 | Eng | |
| 2005/0202830 A1 | 9/2005 | Sudit | 455/456.1 |
| 2005/0246098 A1 | 11/2005 | Bergstrom et al. | 701/213 |
| 2006/0036894 A1 | 2/2006 | Bauer et al. | |
| 2006/0178953 A1 | 8/2006 | Aggarwal et al. | |
| 2006/0242083 A1 | 10/2006 | Chavez | |

OTHER PUBLICATIONS

U.S. Appl. No. 10/231,957, filed Aug. 30, 2002, Serkowski et al.
U.S. Appl. No. 10/232,508, filed Aug. 30, 2002, Rhodes et al.
U.S. Appl. No. 10/231,999, filed Aug. 30, 2002, Walker et al.
U.S. Appl. No. 10/232,906, filed Aug. 30, 2002, Walker et al.
U.S. Appl. No. 10/232,647, filed Aug. 30, 2002, Walker et al.
U.S. Appl. No. 10/811,412, filed Mar. 25, 2004, Walker.
U.S. Appl. No. 10/947,418, filed Sep. 21, 2004, Gilman et al.
U.S. Appl. No. 10/775,498, filed Feb. 9, 2004, Gilman et al.
ADTech Engineering, "IP Phone SI-160 User Manual (SCCP releases)," Version 1.2 (2002), pp. 1-20.
Articsoft Limited, "Public Key Infrastructure (PKI) FAQs" (Feb. 2, 2003), available at http://www.articsoft.com/wp_pki_faq.htm, 5 pages.
ARSYS, "Public Key Infrastructure," (Feb. 4, 2001), available at http://www.transactiontrust.com/technicaindex.htm, 4 pages.
Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.
Datakey, "Securing a Virtual Private Network with Smart Card Technology" available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible," vol. 1, Iss. 1 (Jan. 2000), available at http://www.discerningtoday.org/members/Digest/2000Digest/January/Global%20Control.htm, 2 pages.
Info Merchant Store, "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.
Griswold, Robert S., "Get Smart: The Coming Revolution of Smart Cards," *Journal of Property Management*(May/Jun. 1997), 5 pages.
Entrust Inc., "Entrust Authority Security Manager," (printed Aug. 13, 2004), available at http://www.entrust.com/authority/manager/index.htm, 23 pages.
Infosec Engineering, "Building a Corporate Public Key Infrastructure" (1999), available at http://www.infoseceng.com/corppki.htm, 20 pages.
LockStream Corporation, "Catalyst DRM Service Platform Architecture," Vers. 1.0 (Nov. 2003), pp. 1-28.
LockStream Corporation, "Catalyst DRM Service Platform" (printed Aug. 13, 2004), available at http://www.lockstream.com/products_spcm.php, 1 page.
LockStream Corporation, "Lockstream KeyDRM" (printed Aug. 13, 2004), available at http://www.lockstream.com/products_1gm.php, 2 pages.
LockStream Corporation, "Lockstream OMA 1.0 DRM Client" (printed Aug. 13, 2004), available at http://www.lockstream.com/products_sprm.php, 2 pages.

Microsoft Corporation, "Accessing a Smart Card" (Aug. 2002), available at http://msdn.microsoft.com/library/en-us/security/security/accessing_a_smart_card.asp, p. 1.

Microsoft Corporation, "Base Service Providers" (Aug. 2002), available at http://msdn.microsoft.com/library/en-us/security/security/base_service_providers.asp, p. 1.

Microsoft Corporation, "Building an ISO7816-4 APDU Command" (Aug. 2002), available at http://msdn.microsoft.com/library/en-us/security/security/building_an_iso7816_4_apdu_command.asp, pp. 1-2.

Microsoft Corporation, "Introducing Smart Cards to the System" (Aug. 2002), available at http://msdn.microsoft.com/library/en-us/security/security/introducing_smart_cards_to_the_system.asp, p. 1.

Microsoft Corporation, "Primary Service Provider" (Aug. 2002), available at http://msdn.microsoft.com/library/en-us/security/security/primary_service_provider.asp, p. 1.

Microsoft Corporation, "Smart Card Authentication" (Aug. 2002), available at http://msdn.microsoft.com/library/en-us/security/security/smart_card_authentication.asp, pp. 1-2.

Microsoft Corporation, "Smart Card Interfaces" (Aug. 2002), available at http://msdn.microsoft.com/library/en-us/security/security/smart_card_interfaces.asp, p. 1.

Microsoft Corporation, "Smart Card Resource Manager" (Aug. 2002), available at http://msdn.microsoft.com/library/en-us/security/security/smart_card_resource_manager.asp, p. 1.

Microsoft Corporation, "Smart Card User Interface" (Aug. 2002), available at http://msdn.microsoft.com/library/en-us/security/security/smart_card_user_interface.asp, p. 1.

Microsoft Corporation, "Smart Card Service Providers" (Aug. 2002), available at http://msdn.microsoft.com/library/en-us/security/security/smart_card_service_providers.asp, p. 1.

Microsoft Corporation, "Vendor Wrapper Service Provider" (Aug. 2002), available at http://msdn.microsoft.com/library/en-us/security/security/vendor_wrapper_service_provider.asp, pp. 1-2.

MIT Laboratory for Computer Science, "The Cricket Indoor Location System," An NMS Project (printed Jul. 31, 2002), available at http://nms.lcs.mit.edu/projects/cricket/, 5 pages.

Motorola Press Release, "ERG Motorola Alliance Receives Award for Smart Card" (Jun. 6, 2000), available at http://www.motorola.com/LMPS/pressreleases/page888.htm, 3 pages.

NEC Infrontia Corporation Press Release, "Establishment of "SmartCardInfrontia" solutions for 'IC card'," (Mar. 13, 2002), 4 pages.

Novell® , "Certificate Server: Public Key Instrastructure," White Paper (1999), pp. 1-10.

SecurityConfig, Back Up Your Encrypting File System Private Key in Windows 2000 Download (Printed Aug. 13, 2004), available at http://www.securityconfig.com/software/alerts/back_up_your_encrypting_file_system_private_key_in_windows_2000.html, 2 pages.

Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.

Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.

SSH Communications Security Corp., "Enabling Virtual Public Networks with Public Key Infrastructure," White Paper (Jan. 2004), pp. 1-9.

Streetman, Kibbee D. et al., "Public Key Infrastructure: Resources, Requirements and Recommendations," ATI IPT Special Report 00-06 (Apr. 2000), pp. 1-45.

Sun Developer Network, "Smart Card Overview," Sun Microsystems, Inc. (1994-2004), avaliable at http://java.sun.com/products/javacard/smartcards.html, 2 pages.

NetLingo Dictionary of Internet Words, "Smart Card" (1995-0004), available at http://www.netlingo.com/lookup.cfm?term=smart+card, 2 pages.

Rankl, Wolfgang, "Smart Card Handbook," (Jun. 13, 2004), available at http://www.wrankl.de/SCH/SCH.html, 8 pages.

Russinovich, Mark, "Inside Encrypting File System, Part 1, " Windows & .NET Magazine (Jun. 1999), available at http://www.winntmag.com/Articles/Index.cfm?ArticleID=5387 &Key=Internals, 4 pages.

Russinovich, Mark, "Inside Encrypting File System, Part 2," Windows & .NET Magazine (Jul. 1999), available at http://www.winntmag.com/Articles/Index.cfm?ArticleID=5592 &Key=Internals, 5 pages.

VeriFone Inc., "VeriFone Payment Solutions: Point-of-Sale PINpads" (1997-2004), available at http://www.verifone.com/products/printers_peripherals/html/pinpad_family.html, 1 page.

Whatis.com Target Search™, "PKI" (Jan. 13, 2004), available at http://whatis.techtarget.com/definition/0,289893.sid9_gci214299.00.html, 4 pages.

U.S. Appl. No. 10/956,861, Robinson.

U.S. Appl. No. 11/051,316, Mazza.

Datakey; "Securing a Virtual Private Network with Smart Card Technology"; Aug. 1, 2002; available at www.datakey.com; pp. 1-8.

* cited by examiner

LICENSE FILE SERIAL NUMBER TRACKING

FIELD OF THE INVENTION

The invention relates generally to software licensing and specifically to software licensing in a telecommunication architecture.

BACKGROUND OF THE INVENTION

To protect software manufacturers' copyrights in software sold to the public, manufacturers commonly license software to the purchaser. Additionally, in many applications the purchaser has elected to pay only for certain features of software which must be selectively enabled by the manufacturer. In particular, each release or version of a particular software package for a customer premise telecommunication switching system contains a large number of features, and most customers elect to pay for only a subset of the total number of features. Features in a telecommunications switching system refer to certain specialized operations such as call transfer, automatic route selection, etc. An ongoing problem in the art is to prevent newer versions of software from being pirated and used on unauthorized hardware and/or otherwise authorized customers from actuating features for which the customer has not paid.

A number of methods have been developed to protect against such unauthorized use of software.

In one method, passwords, that only allow authorized individuals to have access to the telecommunication switching system, are used to control enablement of features or new software versions. This method is inflexible and inconvenient for customers as an authorized technician must be scheduled to enable the features, can be circumvented by a person misappropriating or misusing the password, and does not provide for periodic license verification during system operation.

In another method, a key is required to enable the software program. This solution does not solve the copying problem because the key is normally printed on the packaging of the software, and anyone can install the software as many times as they wish, however illegal it may be.

In another method, a special piece of hardware or "dongle" is used. The dongle is a special piece of hardware that connects to the serial or parallel port of the computer. The software running on the computer sends a random number to the dongle. The dongle performs a secret computation and returns a result. The software makes a like computation; if the two computations match, the software continues to run. To work satisfactorily, the response must include feature and version information. The use of the dongle is cumbersome when it fails. In the event that the dongle fails, the system is down until a new dongle can be physically obtained on site. Also, once made the dongle is fixed. If it was used for feature activation, a new dongle is required for each additional feature that is purchased.

Yet another method is to freely distribute CD-ROM disks. When the CD-ROM is inserted into a computer, the computer automatically connects to a remote server via the Internet or a dial-up connection to receive a machine-specific key. The key unlocks the software so that it can be utilized on that computer. The remote server also obtains the necessary payment information from the computer user. This method does not function well for a telecommunication switching system since it does not provide for the authorization to use different features of the same software application nor is it dependent on the version of the software being requested. In addition, it does not provide the necessary authorization of personnel to make such a request.

In yet another method, upon installation or first execution the software records serial number information (e.g., Medium Access Control or MAC address) regarding predetermined hardware components of the computer system. The software permits the user a specified number of hardware serial number changes before it disables itself. This method, though effective, is unfair to users who, over time, legitimately exceed the number of permitted serial number changes through reuse of the software on a number of different systems and/or periodic replacement of some of the predetermined hardware components in a given system to upgrade or maintain the system.

Notwithstanding the foregoing security techniques, computer software vendors continue annually to experience billions in lost sales revenue due to unauthorized use of software.

SUMMARY OF THE INVENTION

These and other needs are addressed by the various embodiments and configurations of the present invention. The method and system of the present invention use various states associated with a unique computational component identifier (which can be one or more numeric, alphabetical, or alphanumeric symbols and have any length, e.g., a serial number, Medium Access Control or MAC address, and the like) to monitor the licensing eligibility of a computational component (e.g., a board or chip such as an ASIC, (control) processor, software, etc.) and/or a functional part thereof (e.g., a module or operable feature such as caller identification, call transfer, automatic route selection, and/or station and port capacities). The method and system can effectively protect and control actuation of one or more computational features, one or more controlled applications, and any other type or form of computational algorithm.

In one embodiment, a (remote) feature activator provides license files for computational components. The license files are provided when an inputted component identifier is validly formatted and has a corresponding record in a licensing database that includes a licensing status field having an acceptable state. The identifier of a computational component is added to the database at a selected point in manufacturing or distribution, typically when the component is shipped from the factory.

The licensing status field is updated throughout the operational life of a computational component by using a variety of licensing state indicators (e.g., flags). Before the computational component is placed into service, the component's identifier in the database has a first state (e.g., valid inactive) indicating that the serial number is eligible for licensing. When the component has been placed into service and is the subject of a valid license, the corresponding identifier is assigned a second state (e.g., valid active) indicating that the identifier is in use and not eligible for licensing of another component. Each time an identifier is used in a license file in the activation system, the identifier's licensing status field is automatically updated in the database. When the component is removed and replaced for maintenance, the identifier is assigned a third state (e.g., invalid open) indicating that the identifier is invalid for licensing unless returned to service. Each time a licensed identifier is replaced with another identifier in the activation system, the identifier's status is automatically updated in the database to the third state. When the component is returned to an eligible facility, the corresponding identifier is assigned a fourth state (e.g., invalid returned) indicating that the component has been returned but is invalid for licensing. Whenever a component is returned to an eligible facility, the corresponding identifier is automatically assigned the fourth state in the database. If the component is scrapped, the corresponding identifier is assigned a fifth state (e.g., invalid scrap) indicating that the identifier is invalid for any future licensing and will not be returned to service. The fifth state is assigned automatically whenever a component is scrapped by the eligible facility. Finally, if the component is refurbished and returned to inventory, the corresponding identifier is reassigned the first state. Like the other states, the first state is reassigned automatically.

When the feature activation system checks the database for an identifier entered by a user for licensing, it rejects any identifier that is not in the database, or does not have the first status.

As will be appreciated, the relationship between the computational component and identifier can take many forms. For example, the computational component can be software, and the identifier can be associated with a hardware component configured to execute the software. In this configuration, the software itself has not been assigned a unique identifier. Alternatively, the computational component can be hardware or software, and the identifier can be assigned directly to the component itself or a system circuit, application, or module of which the component is a part.

The present invention can offer a number of advantages. First, the invention's use of different licensing states can effectively deter piracy of unlicensed software. The states can ensure that a single serial number is used for only a single license, that a serial number is not licensed unless the serial number is valid, and that serial numbers of computational components that have been removed and replaced for maintenance are not used as the basis of another license. Second, the invention permits a component corresponding to an identifier to be assigned a licensing ineligible state and is flexible and convenient for customers as the license generation can be done automatically without involvement by manufacturer personnel. Third, the identifier, unlike a key, cannot be reused by other would be licensees. The invention can thus prevent piracy. Fourth, the invention, unlike a dongle, can provide for ease of convenience for users and does not require hardware for enablement of the licensed component. Fifth, the invention can provide for the authorization to use some but not all features of the same software application, recognize the version of the software being requested, and provide the necessary authorization of personnel to make such a request. Sixth, the invention can be fair to users who, over time, legitimately reuse the software on a number of different systems or who periodically replace some of the predetermined hardware components in a given system to upgrade or maintain the system. Seventh, the invention can effectively provide compliance verification and detect fraud and other abusive conduct. By tracking the history of each computational component, the invention can identify vendors who have higher than normal replacement rates for unreturned computational components or who attempt to reuse previously retired serial numbers to obtain licenses. Eighth, the invention can operate in conjunction an automatic licensing verification system located at the licensed system, such as a licensing verification system as described in U.S. patent application entitled "Securing Feature Activation in a Telecommunication System", Ser. No. 09/357,679, filed Jul. 20, 1999, to Serkowski, and U.S. patent application entitled "Licensing Duplicated Systems", Ser. No. 10/231,957, filed concurrently herewith to Serkowski et al which are incorporated herein by this reference.

These and other advantages will be apparent from the disclosure of the invention(s) contained herein.

The present application is related to U.S. patent application Ser. No. 10/232,906, entitled "REMOTE FEATURE ACTIVATOR FEATURE EXTRACTION" to Walker et al.; Ser. No. 10/232,508, entitled "LICENSE MODES IN CALL PROCESSING" to Rhodes et al.; Ser. No. 10/231,999, entitled "FLEXIBLE LICENSE FILE FEATURE CONTROLS" to Walker et al.; Ser. No. 10/231,957, entitled "LICENSING DUPLICATED SYSTEMS" to Serkowski et al.; and Ser. No. 10/232,647, entitled "SOFTWARE LICENSING FOR SPARE PROCESSORS" to Walker et al., each of which is filed concurrently herewith and is incorporated herein by reference.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
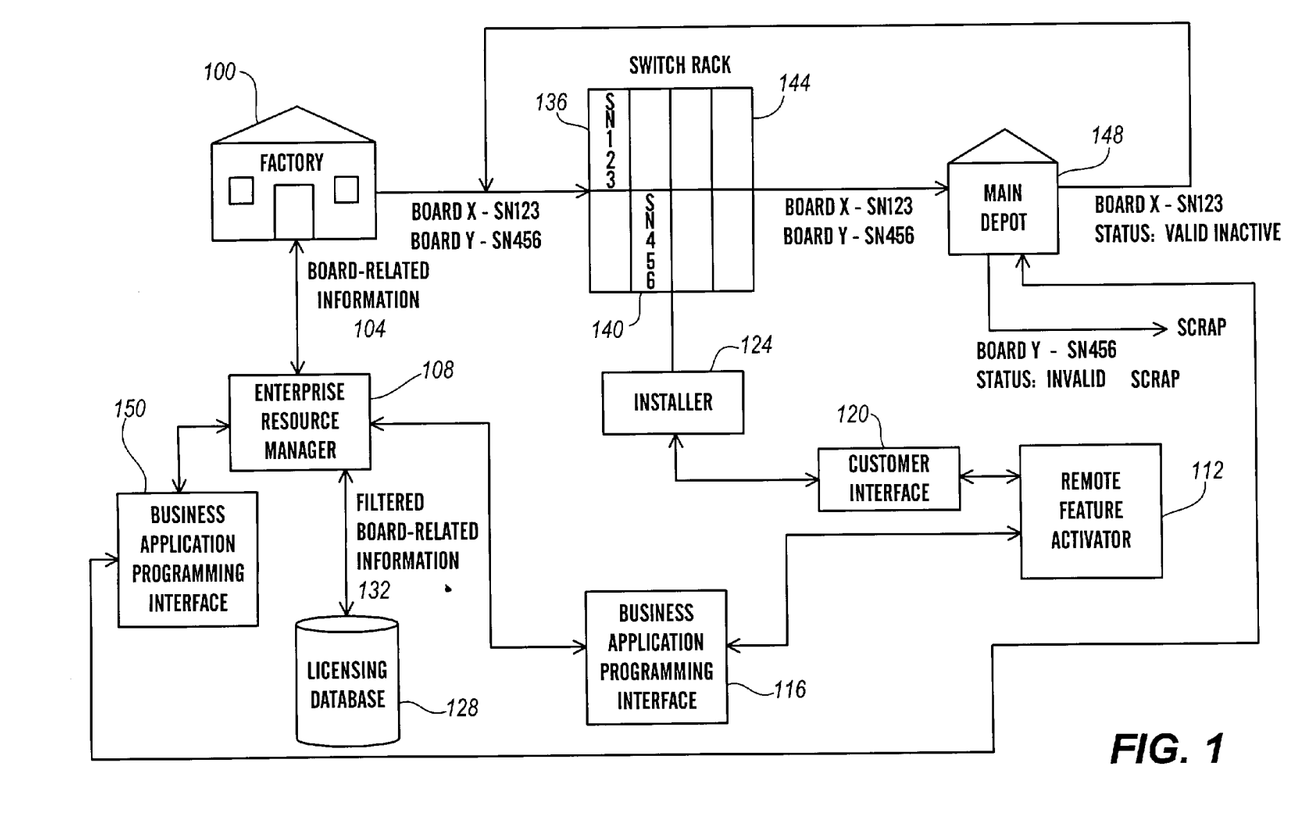
FIG. 1 is a block diagram depicting computational and noncomputational components according to one embodiment of the present invention.

Referring to FIG. 1, the life cycle of a computational component, namely a circuit board, will be discussed to illustrate various features of the present invention. The components are mass produced in a factory 100, or other suitable facility. At some point in the production/sale process, typically before a component is shipped from an inventory warehousing facility (not shown), board-related information 104 is conveyed to an enterprise resource manager 108. Board-related information typically includes a unique serial number (SN) assigned to the component during manufacture, component specifications, and system identifier (such as a sequence number or model number in a set of similar components). The serial number can be any arrangement or number of numeric, alphabetical, or alphanumeric characters and is generated by any suitable technique, such as from an SN interface feed from an outsourced manufacturer or during the post goods issue of a delivery (due to a custom code around the delivery).

A licensing verification system is provided to verify that each serial number is eligible for licensing. The licensing verification system has a number of components, namely the enterprise resource manager or ERM 108, a remote feature activator or RFA 112, a business application programming interface or BAPI 116 between the ERM 108 and RFA 112, a customer interface 120 (such as a website) between an installer/customer 124 and RFA 112, and licensing database 128 containing filtered board-related information 132.

The ERM 108 is configured to cause the addition, update, modification, and validation of entries in the database 128 based on predetermined rules or policies. ERM 108 typically filters through board-related information received from manufacturing, distribution, and sales personnel to maintain desired information in the database 128. The ERM 108 can be any suitable enterprise resource planning software, such as ERP or Enterprise Resource Planning software sold by SAP.

RFA 112 supervises the licensing verification and issuance processes. When a sale of a computational component, such as a board, is approved and finalized, ERM 108 makes appropriate entries in database 128 to reflect the software and features purchased for the specific product involved. When the customer, installer, or distributor 124 visits the RFA 112 via the customer interface 120, the RFA 112 interacts with the ERM 108 via BAPI 116 to verify the components to be licensed and to generate and deliver appropriate licensing messages to the component to be licensed/enabled. Delivery may involve automatic contact with the product, e-mail, immediate http download, or any other suitable technique. RFA 112 also is configured to handle not only new installations but also addition of a computational component such as a software module, a swap or exchange of computational components, an upgrade of a computational component, updates of a computational component, and the manual modification of a record in database 128.

BAPI 116 processes messages conveyed between the ERM 108 and RFA 112 components. In a typical licensing transaction, a serial number-based inquiry is forwarded to ERM 108 by RFA 112. In response to serial number inquiries from RFA 112, ERM 108 accesses the licensing database 128 to read the requested serial number information. A serial number inquiry response containing the requested status information is then returned to RFA 112 by ERM 108. RFA 112 processes the status information and determines if a SN status update is allowed. If the SN status update is allowed, then RFA 112 then forwards a status update to ERM 108, and ERM 108 then updates the database 128 and returns a serial number update response to the RFA 112. The serial number-based inquiry to ERM 108 includes a source to identify the requesting system and an activity code to indicate the processing to be performed by ERM 108. RFA 112 will use two activity codes, namely inquiry and update, to validate the current status of a serial number when it is entered into an RFA transaction and to update the status after the serial number is saved in a system record. Other activity codes include history (to return all historical activity for a serial number) and add (to insert a new serial number entry in a table). RFA 112 uses a number of transaction statuses to characterize a serial number transaction, namely PENDING COMPLETION to indicate that the status of the serial number has been validated in ERM 108 and is ready to be updated to a VALID ACTIVE state (discussed below), PENDING ERROR to indicate that the status of the serial number in ERM 108 indicates that it cannot be updated to VALID ACTIVE and the user must enter a new serial number, PENDING VALIDATION to indicate that the serial number has not been validated due to a system problem and the user must resubmit the serial number for validation, and COMPLETE to indicate that the status of the serial number in ERM 108 has been updated to VALID ACTIVE.

Licensing database 128 is the repository for board-related information and licensing information used by the RFA 112 in performing license verification and component enablement. Licensing database 128 can be managed using any suitable algorithm, such as SAP™ DB software by SAP AG and database software by ORACLE.

As illustrated below, the system uses a number of licensing states to describe the status of computational component corresponding to a serial number. The states are as follows:

(a) VALID INACTIVE means that the component corresponding to the serial number is eligible for licensing but is not currently licensed and operating. This status is assigned to a component when the component is manufactured, shipped, placed in inventory, and/or repaired and returned to inventory. It indicates a valid serial number that is not currently active in any RFA system (i.e., is not currently the subject of a license).

(b) VALID ACTIVE means that the component corresponding to the serial number is currently validly licensed and operating. This indicates that the serial number is now active in an RFA system record.

(c) INVALID OPEN means that the component corresponding to the serial number has been removed from the VALID ACTIVE state. The component no longer has a serial number that is valid for licensing by RFA. The "open" portion of the status indicates that the component has not been returned to the manufacturer.

(d) INVALID RETURNED means that the component corresponding to the serial number has been removed from the VALID ACTIVE state and returned to the manufacturer but has not yet been scrapped or returned to stock. The serial number is not valid for licensing.

(e) INVALID SCRAP means that the component corresponding to the serial number has been removed from the VALID ACTIVE state, returned to the manufacturer, and scrapped. The serial number is not valid for licensing.

As discussed below, the normal progression of state assignments in the life cycle of a computational component are (1) from VALID INACTIVE to VALID ACTIVE, (2) from VALID ACTIVE to INVALID OPEN, (3) from INVALID OPEN to INVALID RETURNED, and (4) from INVALID RETURNED to either INVALID SCRAP or VALID INACTIVE. All state assignments are normally made following this progression without skipping any of these steps.

Figures 2, 3:
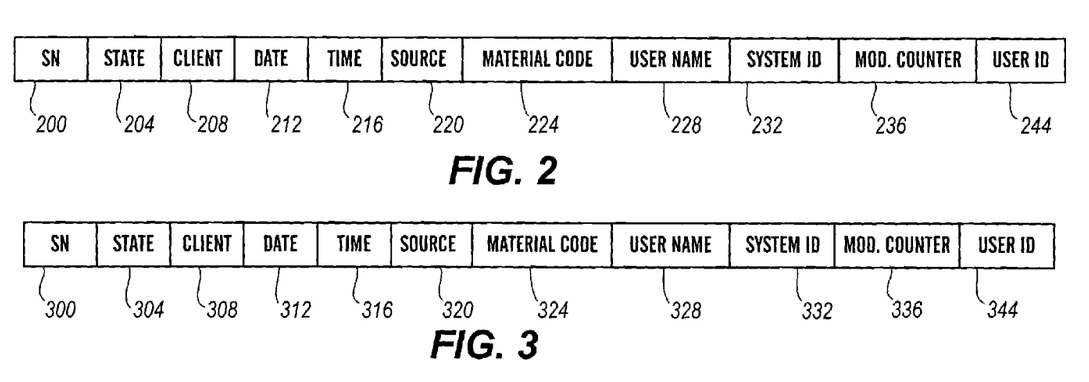
FIG. 2 depicts the data structures in the current table for recording current information regarding a computational component.
FIG. 3 depicts the data structures in the historical table for recording the historical updates in the database associated with a selected computational component serial number.

FIGS. 2 and 3 show the database structures used in the entry. The database includes two tables, namely a current table (FIG. 2) and a historical table (FIG. 3). As can be seen from the figures, the data structures in the two tables are similar. Referring to FIGS. 2 and 3, the entry includes fields for the serial number 200, 300, serial number status or licensing state (discussed above) 204, 304, client or purchaser 208, 308, date 212, 312 and time 216, 316 of creation of the entry, source 220, 320 of update or creation of the entry, material code 224, 324 (e.g., a material code in SAP that defines the hardware having the serial number), name of the user 228, 328 who created the entry, system identifier or SID 232, 332, indicating the system to which the serial number has been assigned for licensing counter ID 236, 336 indicating the licensing identification number of the processor for use in switch/server systems with multiple processing modules, and user identifier 244, 344 of the user who created the entry.

The historical table is maintained because once a serial number is accepted into the database 128, the history of the component associated with the serial number is temporally tracked from that point forward. Serial numbers are not removed from the database 128 and each entry is transferred to the historical table before the entry is altered in response to update commands.

Returning again to FIG. 1, the histories of two hypothetical computational components, namely board X having SN123 and board Y having SN456, will be described to demonstrate the various states that can exist in the licensing state fields 204, 304 of FIGS. 2 and 3. When boards X and Y are manufactured, corresponding entries are created in the licensing database 128, and, in each entry, the board is assigned a state of "VALID INACTIVE". This state implies that the serial number is valid but inactive (meaning that the serial number is not currently licensed but is available to be licensed).

Board X 136 and board Y 140 are sold to a client and installed in a telecommunications switch rack 144. An installer 124, as part of the installation process, contacts customer interface 120 by any suitable technique, such as telephone, e-mail, the Internet, and the like, to enable (license) the boards and/or download software for the boards. Remote feature activator 112 receives the request and the serial numbers of the two boards and, through business application programming interface 116, retrieves the corresponding entry in the licensing database 128 for each board. The unpopulated fields in each entry (namely client and platform information) are completed and the remaining fields updated. The state of each board is changed from VALID INACTIVE to VALID ACTIVE.

After a period of time has passed, both boards X and Y require replacement, board X due to malfunction while board Y due to obsolescence. The installer 124 receives replacement boards for each boards X and Y. RFA 112 causes the entries for boards X and Y to be updated, with the updated status being INVALID OPEN.

Both boards are later returned to the main depot 148, which a second via business application programming interface 150 causes the remote feature activator 112 to update the corresponding entries, such that the state field is changed from INVALID OPEN to INVALID RETURNED. For board Y, which is now obsolete, the board is scrapped by the manufacturer and the new state is INVALID SCRAP. For board X, which is repaired and placed back into service, the new state is VALID INACTIVE.

An embodiment of the licensing process will now be described with reference to flow charts to further illustrate the subject invention.

Figure 4:
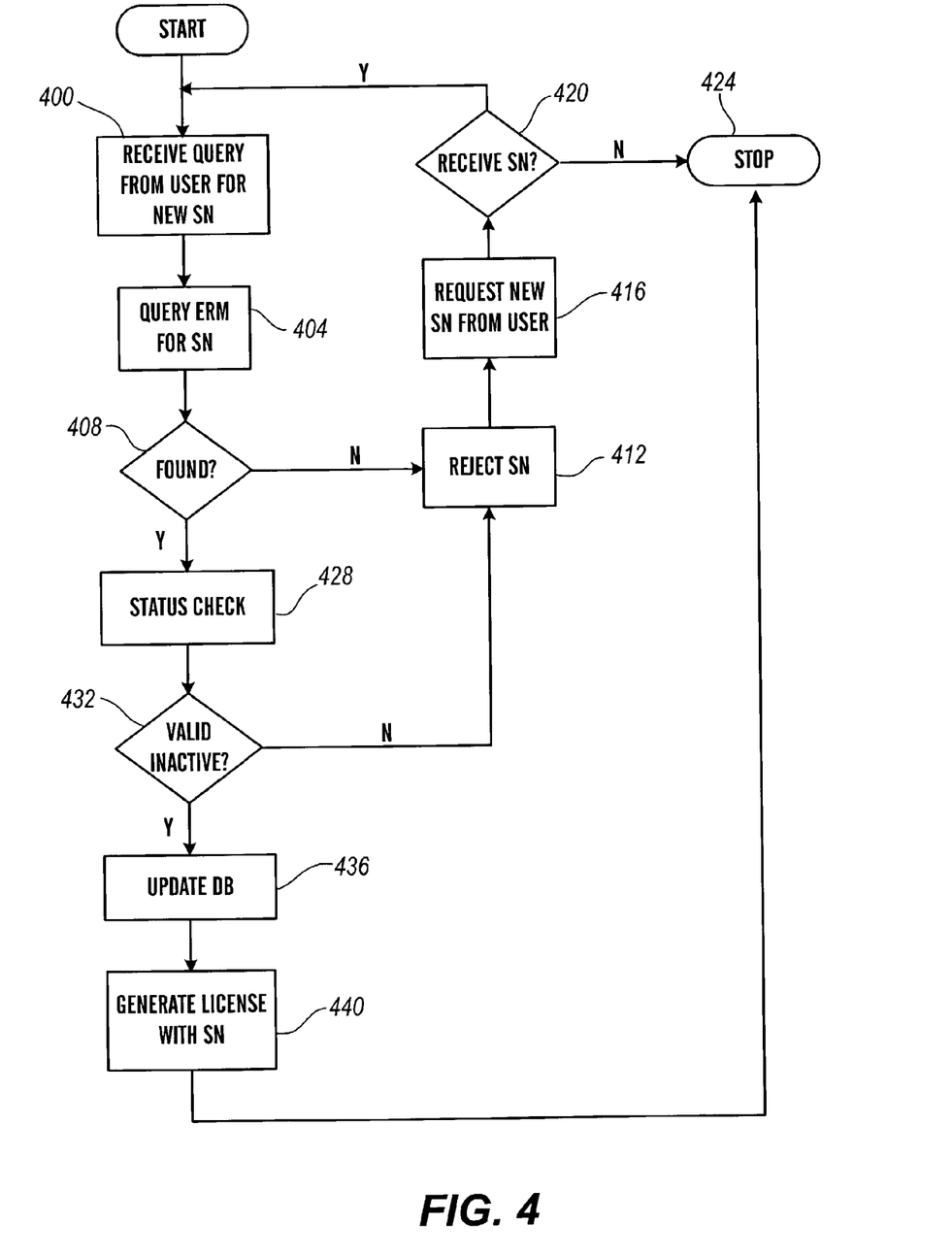
FIG. 4 is a flow chart depicting the licensing verification process for a newly installed hardware component.

Referring to FIG. 4, the process used for verifying and issuing a license for a newly sold computational component is presented. In step 400, the RFA 112 receives a communication from the installer 124 or other type of contactor via the customer interface 120 requesting authorization of the operation of licensed software (e.g., generation and transmission of a license file) and containing a serial number of hardware to execute the software. After verifying that the serial number has the proper length and format, in step 404 sends a query to the ERM 108 regarding a serial number inputted by the installer 124. The query includes the activity code for inquiry.

In decision diamond 408, the ERM 108 determines if an entry corresponding to the serial number is in the database 128.

If no entry is found, the ERM 108 responds to the RFA 112 indicating that there was no hit. The RFA 112 in step 412 rejects the serial number, sets the transaction to PENDING ERROR, and in step 416 displays an error message to the installer 124 (such as "Serial number not valid" and "Please enter a different serial number") and permits the installer 124 to enter a new serial number. In step 420 if a serial number is received within a predetermined time interval, the RFA 112 returns to step 400, and, if a serial number is not received within the predetermined time interval, the RFA terminates the session with the installer in step 424.

If an entry was found, the ERM 108 provides the corresponding entry from the current table of FIG. 2 to RFA 112, including the corresponding status, system identifier, and platform information, and system and module IDs (if the state is VALID ACTIVE). In step 428, the RFA 112 sorts through the information received from the ERM 108 and checks the state field of the message. In decision diamond 432, when the state field value corresponds to a state other than VALID INACTIVE RFA 112 sets the transaction status to PENDING ERROR and proceeds to step 412. When the state field value corresponds to a state of VALID INACTIVE the RFA in step 436 updates the licensing database with a state of VALID ACTIVE for the serial number.

Figure 5:
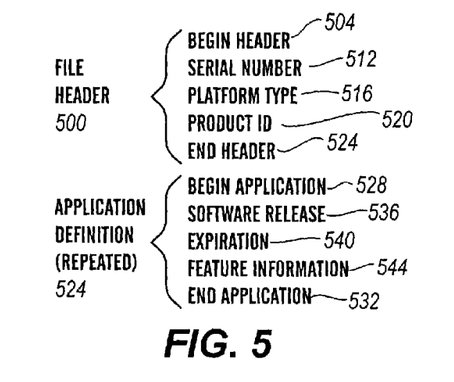
FIG. 5 depicts the licensing information transmitted to the remote computational system of the user upon successful licensing verification.

The RFA 112 generates an encrypted licensing file in step 440 and causes the file to be uploaded to the computational component having a format shown in FIG. 5. The licensing file includes a file header 500 which includes header beginning and ending fields 504 and 508 respectively, a serial number field 512 (containing the serial number), a platform type field 516 (containing first platform information), and a platform identifier field 520 (containing second platform information different from the first platform information), and one or more application definitions 524 each of which includes application beginning and ending fields 528 and 532, respectively, a software release field 536 (identifying software release version), an expiration field 540 (expiration date of license), and a feature field 544 (containing information relating to the features to be enabled). When the licensing communications are completed successfully, the RFA 112 can display a suitable message such as "Licensing completed" to the installer 124.

In step 440, the RFA 112 sends an update command to the ERM 108 requesting the entry for the serial number to be updated to reflect a VALID ACTIVE state. The update command includes, among other things, the serial number, system identifier, and platform information. After updating the command based on the source of the command and transferring the previous entry to the historical table of FIG. 3 and updating the current entry, the ERM 108 sends a response to the RFA 112 indicating if the serial number status was successfully updated by using one of the statuses noted above. The RFA 112 then proceeds to step 424 and terminates the session.

Figure 6:
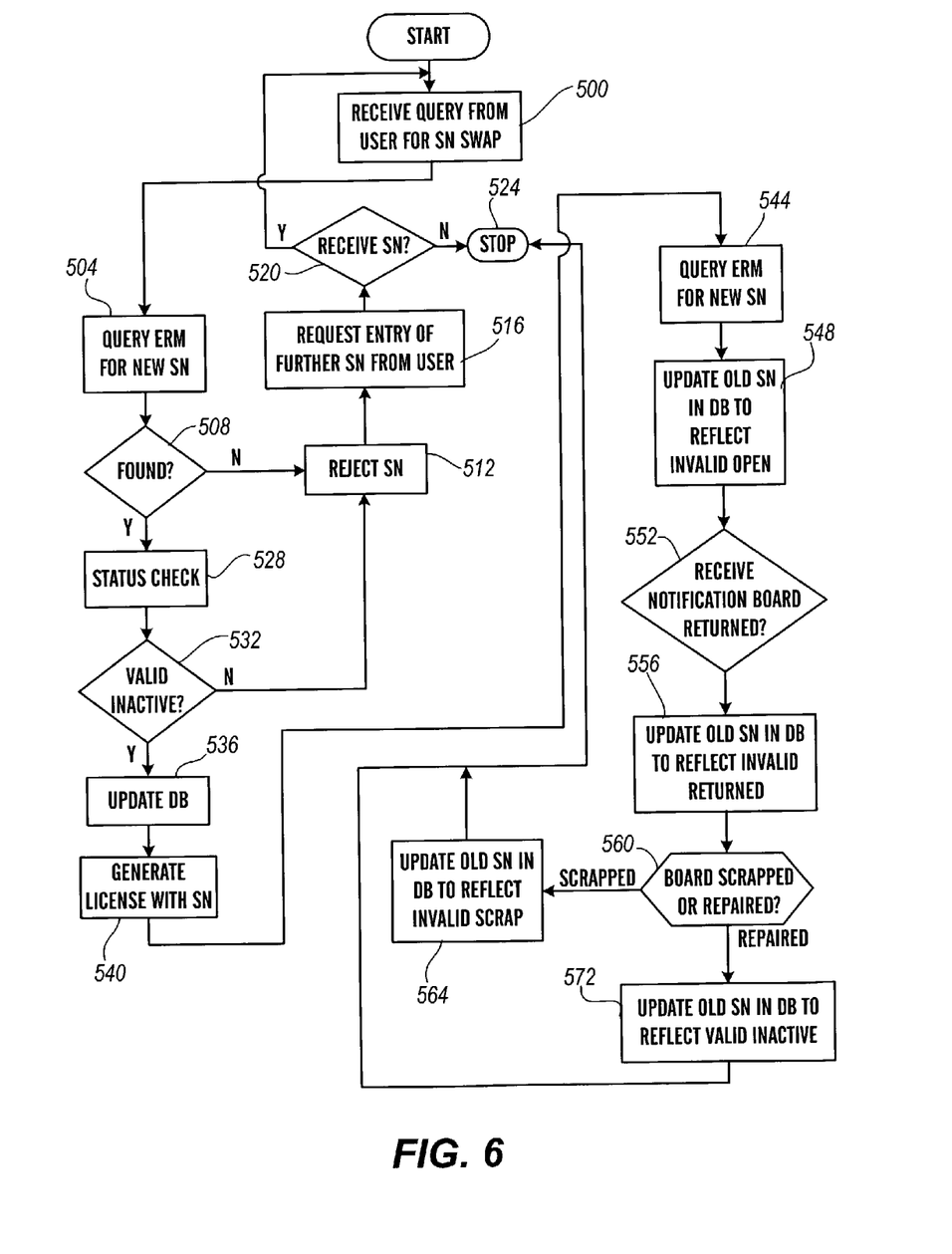
FIG. 6 is a flow chart depicting the licensing verification process for an exchange of computational components.

Referring now to FIG. 6, the steps performed for an exchange of computational components will now be discussed. In step 500, the RFA 112 receives through interface 120 a query from the installer 124 for a serial number swap or exchange. The installer 124 typically initiates the query by entering the serial numbers to be exchanged and clicking an icon on his graphical user interface.

The processing of the request is bifurcated. The serial number of the component being replaced is processed differently from the serial number of the replacement component. The serial numbers can be processed sequentially (in any order) or simultaneously, as desired. In the configuration of FIG. 6, the processing of the new serial number is performed before the swapped out serial number.

Referring again to FIG. 6, in step 504 the RFA 112, after verifying that the serial number has the proper length and format, queries the ERM 108 for the new serial number as noted above. In decision diamond 508, when the new serial number is not found, the RFA 112 sets the transaction status to PENDING ERROR, rejects the serial number in step 512 and causes the new serial number and messages such as "Swap out cannot be performed" and "Please enter a different serial number" to be displayed to the user in step 516. In step 520 if the new serial number is not received within a predetermined time interval, the RFA 112 terminates the session in step 524, and, if the new serial number is received within the predetermined interval, the RFA 112 returns to step 500. Returning again to decision diamond 508, when the new serial number is found the RFA 112 performs a status check in step 528 as noted above. In step 532 when the status is not VALID INACTIVE, the RFA 112 sets the transaction status to PENDING ERROR and proceeds to step 512, and, when the status is VALID INACTIVE, the RFA 112 causes the ERM 108 to update the database entry for the new serial number in step 536 and accepts the serial number in step 540 for licensing, displays a message such as "Swap out complete" to the installer.

The RFA 112 then performs the steps for processing the swapped out or old serial number. In step 544, the RFA 112, after verifying that the serial number has the proper length and format, queries ERM 108 for the old serial number. Unlike the new serial number, when the old serial number is not found or when the old serial number does not have a status of VALID ACTIVE, the swap out is performed. An entry is made in the entry for the old serial number or a separate table to further investigate the reason why the serial number is not in the database 128 or the status is not VALID ACTIVE.

In step 548, the RFA 112 sends an update request to the ERM 108 causing the record for the old serial number to be updated to reflect a new status of INVALID OPEN. As noted, this status prevents the RFA 112 from issuing another license to a system using the component corresponding to the old serial number.

In step 552, the RFA 112 determines if a notification has been received that the component corresponding to the old serial number has been returned. When the notification has not been received, the RFA 112 proceeds to step 524. When the notification has been received, the RFA 112 in step 556 sends an update request to the ERM 108 causing the record for the old serial number to be updated to reflect a new status of INVALID RETURNED.

In step 560, the RFA 112 determines whether the component is to be scrapped or repaired. When the component is to be scrapped, the RFA 112 in step 564 causes the record corresponding to the serial number to be updated to reflect a new status of INVALID SCRAP.

When the component is to be repaired, the RFA 112 causes the ERM 108 to update the record corresponding to the serial number to reflect a new status of VALID INACTIVE and proceeds to step 572.

As will be appreciated, one or more interfaces (are such as BAPI 150) provided to permit status changes to be entered when a component is returned and thereafter. These interfaces allow the notifications to be sent causing a status change from INVALID OPEN to INVALID RETURNED, INVALID SCRAP, and/or VALID INACTIVE.

A number of variations and modifications of the invention can be used. It would be possible to provide for some features of the invention without providing others.

For example in one alternative embodiment, the data structures of FIGS. 2 and/or 3 can include other fields as desired such as transaction status, a transaction identifier, an ERM return code or status corresponding to the transaction identifier, and error message code and/or other tables, such as invalid serial number swap out (which includes, among other things, the swapped out serial number, swap out date/time, serial number status, and the like and is used to list serial numbers that were updated to a status of INVALID OPEN but the previous state was not VALID ACTIVE or the serial number was not found in the database), outstanding transaction serial number update (which contains serial numbers that need to be manually updated), transaction serial number error (which contains error messages and/or ERM return code and status encountered during a serial number query), and module serial number error (which contains error message and/or ERM return code and status encountered during serial number query or update).

In another alternative embodiment, the database 128 resides in RFA 112 and includes an interface to the factory 100 to get a listing of all valid serial numbers produced with ongoing updates as additional components are manufactured. Licensing would then be limited to only serial numbers identified as valid by the factory 100. To simply the database, the database can be used to track only serial numbers that have been licensed by RFA and not all serial numbers produced.

In another alternative embodiment, RFA 112, ERM 108, and BAPI 116 are implemented, in whole or part, as software and/or hardware, e.g., an application specific integrated circuit.

In another alternative embodiment, the states of the serial numbers are used differently than set forth above. For example, in a serial number change due to a network reconfiguration the serial number is not changed due to a maintenance swap out. In this situation, the serial number state can remain VALID ACTIVE, i.e., no update to the database 128 is required.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for monitoring licensing eligibility of a computational component, the computational component being associated with a unique identifier, comprising:

receiving a request to authorize operation of at least a functional part of the computational component;

retrieving from a licensing database information associated with the identifier, the information comprising a licensing state indicator, the licensing state indicator indicating an eligibility to be licensed of the at least a functional part of the computational component;

when the licensing state indicator has at least one of a first and second state, authorizing operation of the at least a functional part of the computational component; and when the licensing state indicator has one of a third and fourth state other than the at least one of a first and second state, not authorizing operation of the at least a functional part of the computational component, the at least one of the first and second states, third state, and fourth state are different from one another.

2. The method of claim 1, wherein the request comprises the identifier and, when the identifier is formatted properly and has a corresponding record in a licensing database that includes the licensing state identifier in the first state, causes transmission of a license file.

3. The method of claim 1, wherein the information also comprises an identity of a customer, a system identifier, a modification identifier and a user identifier and wherein the licensing state indicator value is indicative of an operational state of the computational component.

4. The method of claim 1, wherein the first state indicates that the identifier is valid and eligible for licensing but is not currently licensed and operating, the second state that the identifier is valid and eligible for licensing and is currently licensed and operating and wherein the third and fourth states indicate that the identifier is either invalid or valid and not eligible for licensing.

5. The method of claim 1, wherein the first state is valid inactive, the second state is valid active, and the third state is invalid open, the fourth state is invalid returned, and wherein the licensing state indicator can have a fifth state, the fifth state being invalid scrap.

6. The method of claim 5, wherein, when the licensing state indicator has one of the third, fourth, and fifth states, the at least a functional part of the computational component is not enabled.

7. The method of claim 1, wherein the at least one of the first and second states indicates one of (a) the computational component corresponding to the identifier is eligible for licensing but is currently not licensed and (b) that the computational component corresponding to the identifier is is currently licensed and the third and fourth states a respective one of (a) the computational component corresponding to the identifier is invalid for licensing unless returned to service, (b) the computational component corresponding to the identifier has been returned, and (c) that the computational component corresponding to the identifier has been scrapped.

8. The method of claim 1, further comprising:
when the computational component is sold, assigning the first state to the licensing state indicator;
when the a license for the computational component has been generated, assigning the second state to the licensing state indicator; and
performing at least two of the following three substeps:
when the computational component has been removed from service, assigning the third state to the licensing state indicator;
when the computational component has been returned to the manufacturer, assigning the fourth state to the licensing state indicator; and
when the computational component has been scrapped, assigning a fifth state to the licensing state indicator.

9. The method of claim 1, wherein the authorizing step comprises:
when the licensing state indicator has the first state, generating a license file, the license file comprising a header and at least one application definition, the header including the identifier and the at least one application definition including at least one feature to be enabled and a duration of the license; and
transmitting the license file to the computational component.

10. The method of claim 1, further comprising:
receiving a request to disable the at least a functional part of the computational component;
disabling the at least a functional part of the computational component; and
assigning to the licensing state indicator the third state, wherein the third state indicates that the identifier is not eligible for licensing.

11. The method of claim 10, wherein the licensing state indicator does not have the at least one of the first and second state and further comprising:
receiving a notification that the at least a functional part of the computational component is being returned to service; and
reassigning the first state to the at least a functional part of the computational component.

12. A computer readable medium comprising processor executable instructions to perform the steps of claim 1.

13. A system for monitoring licensing eligibility of a computational component, the computational component being associated with a unique identifier, comprising:
an input operable to receive a request to authorize operation of at least a functional part of the computational component;
a memory comprising licensing database information associated with the identifier, the information comprising a licensing state indicator, the licensing state indicator indicating an eligibility of the at least a functional part to be licensed; and
an activator operable to (a) authorize operation of the at least a functional part of the computational component when the licensing state indicator has at least a first value and (b) not authorize operation of the at least a functional part of the computational component when the licensing state indicator has at least a second value different from the first value, wherein the first value indicates at least one of (i) the computational component corresponding to the identifier is eligible for licensing but is currently not licensed and (ii) the computational component corresponding to the identifier is currently licensed and the at least a second value indicates at least one of (i) the computational component corresponding to the identifier is invalid for licensing unless returned to service, (ii) the computational component corresponding to the identifier has been returned, and (iii) the computational component corresponding to the identifier has been scrapped.

14. The system of claim 13, wherein the request comprises the identifier and, when the identifier is formatted properly and has a corresponding record in a licensing database that includes the licensing state identifier having the first value, causes transmission of a license file.

15. The system of claim 13, wherein the information also comprises an identity of a customer, a system identifier, a modification identifier, and a user identifier and wherein the licensing state indicator value is indicative of an operational state of the computational component.

16. The system of claim 13, wherein the first value indicates that the computational component corresponding to the identifier is eligible for licensing but is currently not licensed.

17. The system of claim 13, wherein the at least a first value corresponds to first and second states, wherein the at least a second value corresponds to third, fourth, and fifth states, and wherein the first state is valid inactive, the second state is valid active, the third state is invalid open, the fourth state is invalid returned, and the fifth state is invalid scrap.

18. The system of claim 17, wherein when the licensing state indicator has one of the third, fourth, and fifth states the at least a functional part of the computational component is not enabled by the activator.

19. The system of claim 17, wherein the at least a first value indicates that the computational component corresponding to the identifier is is currently licensed and further comprising:
a manager operable to assign the second state to the licensing state indicator when the at least a functional part of the computational component is enabled, wherein the information is in a current table and wherein the manager maintains a historical table containing noncurrent information associated with the identifier.

20. The system of claim 13, wherein the activator is operable to (a) generate a license file, the license file comprising a header and at least one application definition, the header including the identifier and the at least one application definition including at least one feature to be enabled and a duration of the license and (b) transmit the license file to the at least a functional part of the computational component.

21. The system of claim 19, wherein, when the input receives a request to disable the at least a functional part of the computational component, the activator disables the at least a functional part of the computational component and wherein the manager assigns to the licensing state indicator the at least a second value, wherein the at least a second value indicates that the identifier is not eligible for licensing.

22. The system of claim 21, wherein, when the input receives a notification that the at least a functional part of the computational component is being returned to service, the manager reassigns the at least a first value to the at least a part of the computational component.

23. The system of claim 13, wherein the at least a second value indicates that the computational component corresponding to the identifier is invalid for licensing unless returned to service.

24. The system of claim 13, wherein the at least a second value indicates that the computational component corresponding to the identifier has been returned to service.

25. The system of claim 13, wherein the at least a second value indicates that the computational component corresponding to the identifier has been scrapped.

26. The system of claim 13, wherein the first state corresponds to at least one of a first and second state, wherein the second value corresponds to at least one of a third, fourth, and fifth state, and wherein the activator is operable to:
perform at least one of the following two sub-operations:
(B1) when the computational component is sold, assign the first state to the licensing state indicator;
(B2) when a license for the computational component has been generated, assign the second state to the licensing state indicator; and
perform at least two of the following three operations:
(C1) when the computational component has been removed from service, assign the third state to the licensing state indicator;
(C2) when the computational component has been returned to the manufacturer, assign the fourth state to the licensing state indicator; and
(C3) when the computational component has been scrapped, assign the fifth state to the licensing state indicator.

27. The system of claim 26, wherein sub-operation (B1) is performed.

28. The system of claim 26, wherein sub-operation (B2) is performed.

29. The system of claim 26, wherein sub-operation (C1) is performed.

30. The system of claim 26, wherein sub-operation (C2) is performed.

31. The system of claim 26, wherein sub-operation (C3) is performed.

32. The system of claim 26, wherein sub-operations (B1) and (B2) are performed.

33. The system of claim 26, wherein a plurality of sub-operations (C1), (C2), and (C3) are performed.

34. The system of claim 26, wherein each of sub-operations (C1), (C2), and (C3) are performed.

35. A system for monitoring licensing eligibility of a computational component, the computational component being associated with a unique identifier, comprising:
an input operable to receive a request to authorize operation of at least a functional part of the computational component;
a memory comprising licensing database information associated with the identifier, the information comprising a licensing state indicator, the licensing state indicator indicating an eligibility of the at least a functional part to be licensed;
an activator operable to:
(i) receive a request to authorize operation of at least a functional part of the computational component;
(ii) retrieve from the licensing database information associated with the identifier, the information comprising the licensing state indicator, the licensing state indicator indicating an eligibility to be licensed of the at least a functional part of the computational component;
(iii) when the licensing state indicator has at least one of a first and second state, authorize operation of the at least a functional part of the computational component; and
(iv) when the licensing state indicator has one of a third and fourth state other than the at least one of a first and second state, not authorize operation of the at least a functional part of the computational component, wherein the at least one of the first and second states, third state, and fourth state are different from one another.

36. The system of claim 35, wherein the request comprises the identifier and, when the identifier is formatted properly and has a corresponding record in a licensing database that includes the licensing state identifier in the first state, causes transmission of a license file.

37. The system of claim 35, wherein the information also comprises an identity of a customer, a system identifier, a modification identifier and a user identifier and wherein the licensing state indicator value is indicative of an operational state of the computational component.

38. The system of claim 35, wherein the first state indicates that the identifier is valid and eligible for licensing but is not currently licensed and operating, the second state that the identifier is valid and eligible for licensing and is currently licensed and operating and wherein the third and fourth states indicate that the identifier is either invalid or valid and not eligible for licensing.

39. The system of claim 35, wherein the first state is valid inactive, the second state is valid active, and the third state is invalid open, the fourth state is invalid returned, and wherein the licensing state indicator can have a fifth state, the fifth state being invalid scrap.

40. The system of claim 39, wherein, when the licensing state indicator has one of the third, fourth, and fifth states, the at least a functional part of the computational component is not enabled.

41. The system of claim 35, wherein the at least one of the first and second states indicates one of (a) the computational component corresponding to the identifier is eligible for licensing but is currently not licensed and (b) that the computational component corresponding to the identifier is currently licensed and the third and fourth states a respective one of (a) the computational component corresponding to the identifier is invalid for licensing unless returned to service, (b) the computational component corresponding to the identifier has been returned, and (c) that the computational component corresponding to the identifier has been scrapped.

42. The system of claim 35, wherein the activator further performs the sub-operations:

when the computational component is sold, assign the first state to the licensing state indicator;

when the a license for the computational component has been generated, assign the second state to the licensing state indicator;

when the computational component has been removed from service, assign the third state to the licensing state indicator;

when the computational component has been returned to the manufacturer, assign the fourth state to the licensing state indicator; and when the computational component has been scrapped, assign a fifth state to the licensing state indicator.

43. The system of claim 35, wherein the licensing state indicator does not have the at least one of the first and second state and wherein the authorizing sub-operation comprises:

when the licensing state indicator has the first state, generating a license file, the license file comprising a header and at least one application definition, the header including the identifier and the at least one application definition including at least one feature to be enabled and a duration of the license;

transmitting the license file to the computational component;

receiving a request to disable the at least a functional part of the computational component;

disabling the at least a functional part of the computational component;

assigning to the licensing state indicator the third state, wherein the third state indicates that the identifier is not eligible for licensing;

receiving a notification that the at least a functional part of the computational component is being returned to service; and reassigning the first state to the at least a functional part of the computational component.

\* \* \* \* \*